Figure 1:
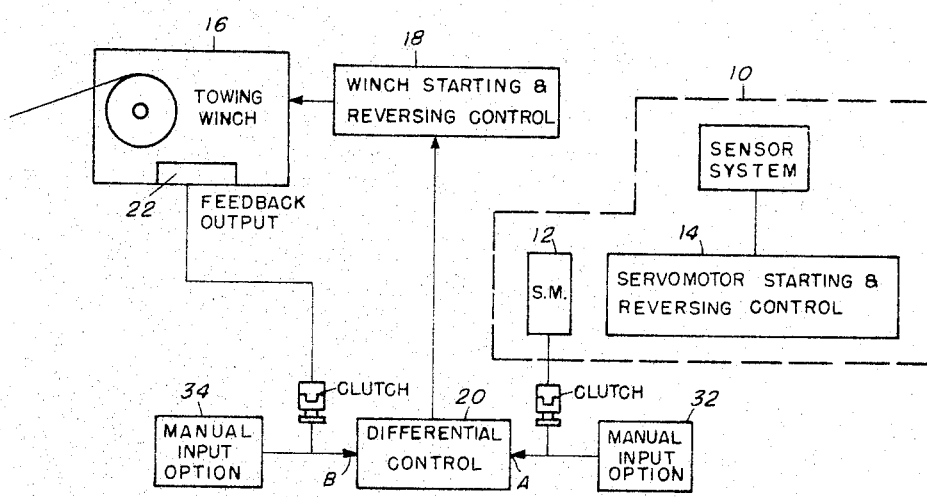

Oct. 4, 1966     A. M. NICKERSON, JR     3,276,748

TOWING WINCH CONTROL

Filed Oct. 12, 1964

INVENTOR

ARCHER M. NICKERSON, JR.

BY John J. Byrne

ATTORNEY

United States Patent Office 3,276,748
Patented Oct. 4, 1966

3,276,748
TOWING WINCH CONTROL
Archer M. Nickerson, Jr., East Weymouth, Mass., assignor to The Continental Oil Company, Ponca City, Okla., a corporation of Delaware
Filed Oct. 12, 1964, Ser. No. 403,167
4 Claims. (Cl. 254—173)

This invention relates to the towing of an unmanned submersible barge by a towing vessel.

An important object of this invention is to provide an automatic depth corrective control system on the towing vessel which is responsive to the output of a depth sensor located on the submerged barge, such control accomplished by varying the cable length.

Generally, this control system includes a servomotor, a servomotor starting and reversing control energized by the depth sensor, a differential responsive to the servomotor for controlling the winch starting and reversing control and a feedback operable by winch drum rotation for producing an output opposite in sign to the input causing the winch rotation, controlling the differential during the rotation of the winch in either one of two corrective directions. The above system permits the differential control to be moved to a neutral position to effect deenergization of the winch control and thereby the stopping of the winch.

Another objective of the invention is to provide clutch means in the control system for manually controlling the winch drum in lieu of the servo control and/or feedback means.

These and other objectives and advantages of the invention will become more apparent upon a reading of the following description of one system made in accordance with the invention as diagrammatically illustrated by way of example in the drawings, in which:

FIGURE 1 is a schematic diagram of the control system for the towing winch; and

Figure 2:
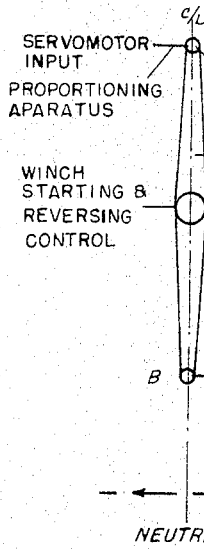
Figure 3:
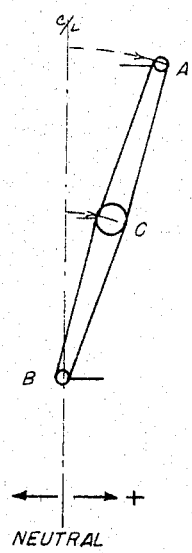
Figure 4:
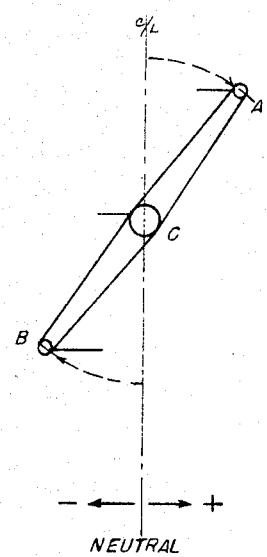

FIGURES 2–4, depicting one form of a mechanical differential control and its sequential movement which is capable of being used as the differential control of FIGURE 1.

With reference now to the drawings where like numerals indicate like elements, a sensor system 10 having a servo motor 12 and a starting and reversing control 14 are shown within the broken outline and the details thereof as well as the manner in which the sensing information is received and is digested is explained in assignee's copending application, Serial No. 403,166 filed this same date by John D. Shuster. Briefly, the system operates as follows. A depth sensor located on the submerged vessel (not shown) sends a signal to a receiving component positioned on the towing vessel when the submerged barge deviates from its selected depth. The received signal is fed into the control 14 for the servo motor 12 which energizes the servo motor to start the towing winch 16 by the actuation of control 18. The control 18 is effective to either take-up or pay-out cable upon an increase or decrease in the depth of the submerged vessel.

A differential control 20 is interposed between the servomotor 12 and a feedback output 22 which can be driven directly by the winch drum, causing the rotation of the winch to be proportional to the number of turns made by the servomotor 12 in any one depth corrective operation. The differential control 20 is also effective for receiving a signal from the feedback 22 which is turning in a direction opposite to that of the winch drum for moving the differential to a "neutral" position. This thereby deenergizes the winch control to stop the rotation of the winch when the barge reaches its selected level.

One exemplary operative mode of operation of the above system can be traced:

Starting with all controls deenergized and the differential control in a "neutral" position with the winch stationary, the servomotor control is energized upon the receiving of a signal from the depth sensor. The servomotor may make plus X revolutions, moving the differential control off "neutral" in a direction to start the winch to haul in cable. (The "plus" direction of drum rotation.) As the drum 16 is making plus AX revolutions, the feedback output from the drum to the differential 20 turns minus X revolutions. This restores the differential control to "neutral," deenergizes the winch control and stops the winch.

With reference to FIGURES 2–4, one form of a mechanical differential control lever and its movement is illustrated. As seen in FIGURE 2, the end A of the floating lever A–B receives the input from the servomotor while the end B receives the signal from the winch feedback. Connected to the end A is a proportioning apparatus of any known construction which is effective to proportion the movement of the end A to the motion of the servomotor. Connected to the end B is a proportioning apparatus for converting the motion of the winch drum to movement of the end B. This, likewise, may be of any known construction. The intermediate point C designates the connection leading to the winch starting and reversing control. The point C need not be located at the mid-length of the lever AB because of reasons hereinafter described.

The vertical centerline 30 is the "neutral" centerline of the differential for point C, and when C moves to the right of the line, the winch will start and run in the plus direction of drum rotation. When point C is moved to the left, the direction is reversed or "minus." If point C is on the centerline or "neutral," the winch will be stopped.

In the description of the operation given above, the servomotor is moved in the "plus" direction. This assumes that with point B momentarily acting as a fulcrum, point A is moved to the right (FIG. 3). The resulting lever motion carries point C to the right also. This starts the winch in the "plus" direction, but the response of the winch feedback is negative; that is, point B (FIG. 4) moves to the left. When the servomotor stops, point A becomes the fulcrum, point B continues to the left until point C returns to "neutral," whereupon all motion is arrested.

In normal service, points A and B may move continuously, the offset of point C representing theoretically the difference between length of line signalled by the servomotor and delivered by the winch.

The differential control is also utilized to reestablish the tow line length if the winch is overhauled as the result of a surge. In this case the servomotor is deenergized and stationary. Assuming that Y feet of line are hauled out, the winch drum makes minus BY revolutions. Using for illustration the ratio in the first example, the feedback input from the winch to the differential is *plus BY/A* revolutions. This moves the differential control off "neutral" to start the winch in the "plus" direction of drum revolution. As the line is hauled in, the feedback turns in the minus sense. When Y feet are recovered, the drum will have turned *plus* BY revolutions and the feedback *minus BY/A* revolutions. This returns the differential to "neutral" and stops the winch.

If the winch is overhauled, point A, assuming that the servomotor is deenergized, becomes the fulcrum and point B is moved to carry point C off the neutral centerline. Assuming that B moves in a "plus" direction, as a result, C will be moved in a "plus" direction also. The "plus" response of the winch moves the feedback in the opposite direction, returning "C" to "neutral" and stopping the winch when the length of line has been recovered.

By virtue of the clutches 32 and 34, either input may be disconnected from the differential in order to control the winch by hand. If the manual input comes from the feedback side, the winch may be started, stopped and reversed. Its speed may also be controlled at the will of the operator; depending upon the winch control characteristics. If the manual input comes from the servo motor side and the feedback remains clutched in, the number of revolutions of the winch drum will be proportional to the number of turns of the hand-wheel or crank and the direction of winch drum rotation will depend upon the direction of rotation of such manual input.

As many embodiments may be made of this inventive concept, and as many modifications may be made in the embodiment hereinshown and described, it is to be understood that all matter herein is to be interpreted merely as illustrative and not in a limiting sense.

I claim:

1. A control means for a winch having a cable wound thereabout and a length of cable extending therefrom and attached to a submersible barge, comprising first means to develop a first output responsive to the depth of said barge deviating from a norm, a servomotor operable in response to said first output, a differential control driven by said servomotor, drive means of said differential rotating said winch an amount in proportion to said first output, feedback means developing a feedback output opposite to said first output, second means transmitting said feedback signal to said differential causing winch rotation to stop when said feedback signal equals said first output.

2. A control means for a winch having a cable wound thereabout and a length of cable extending therefrom, and attached to a submersible barge, comprising first means to develop a first output responsive to the depth of said barge deviating from a norm, a servomotor operable in response to said first output, a differential control driven by said servomotor of a type having a first and second inputs and a single output reflecting the difference between said inputs, drive means of said differential rotating said winch an amount in proportion to said first output, feedback means developing a feedback output opposite to said first output, second means transmitting said feedback signal to said differential causing winch rotation to stop when said feedback signal equals said first output.

3. In a system wherein a vessel tows a submersible barge via a section of cable extending between the vessel and the barge, said cable having a portion wound about a winch drum on said vessel and wherein said barge is to be towed at a selected depth;

means producing a first output when said barge deviates from said selected depth, a differential accepting said first output, drive means between said differential and said winch drum for rotating the drum in proportion to said first output, means directing a feedback to said differential from said winch drum in direct proportion to the rotation developed by said first output.

4. The system defined in claim 3 wherein said means for producing a first output includes a depth sensing instrument, a servomotor, and means coupling an output from said instrument to said servomotor.

References Cited by the Examiner

UNITED STATES PATENTS

| 1,634,912 | 7/1927 | Miller | 254—172 |
| 2,393,048 | 1/1946 | Mahnke | 254—172 |
| 2,414,473 | 1/1947 | Mahnke | 254—172 |
| 2,950,086 | 8/1960 | Abraham | 254—173 |
| 3,088,710 | 5/1963 | Evans | 254—172 |

SAMUEL F. COLEMAN, *Primary Examiner.*